(12) United States Patent
Cano

(10) Patent No.: US 9,389,432 B2
(45) Date of Patent: Jul. 12, 2016

(54) COSMETIC CONTACT LENS WITH VIVID SPARKLING COLOR OVER THE IRIS

(71) Applicant: Colloidal Materials, LLC, Export, PA (US)

(72) Inventor: Gerald G. Cano, Export, PA (US)

(*) Notice: Subject to any disclaimer, the term of this patent is extended or adjusted under 35 U.S.C. 154(b) by 101 days.

(21) Appl. No.: 14/163,099

(22) Filed: Jan. 24, 2014

(65) Prior Publication Data

US 2014/0204336 A1    Jul. 24, 2014

Related U.S. Application Data

(60) Provisional application No. 61/756,128, filed on Jan. 24, 2013.

(51) Int. Cl.
G02C 7/04    (2006.01)

(52) U.S. Cl.
CPC .............. *G02C 7/046* (2013.01); *G02C 7/049* (2013.01)

(58) Field of Classification Search
CPC ...................................... G02C 7/046
USPC ...................................... 351/159.35
See application file for complete search history.

(56) References Cited

U.S. PATENT DOCUMENTS

| | | | |
|---|---|---|---|
| 5,071,207 A * | 12/1991 | Ceglio et al. | 359/15 |
| 5,281,370 A | 1/1994 | Asher et al. | |
| 5,989,923 A | 11/1999 | Lowe et al. | |
| 6,123,845 A | 9/2000 | Asher et al. | |
| 7,059,719 B2 | 6/2006 | Asher | |
| 8,317,321 B2 * | 11/2012 | Haddock et al. | 351/159.01 |
| 8,950,862 B2 * | 2/2015 | Pugh et al. | 351/159.73 |
| 9,039,173 B2 * | 5/2015 | Tucker et al. | 351/159.31 |
| 9,069,186 B2 * | 6/2015 | Pugh et al. | |
| 2003/0027240 A1 * | 2/2003 | Asher et al. | 435/25 |
| 2012/0147320 A1 * | 6/2012 | Legerton et al. | 351/159.04 |

* cited by examiner

*Primary Examiner* — Bumsuk Won
*Assistant Examiner* — Grant Gagnon
(74) *Attorney, Agent, or Firm* — The Webb Law Firm

(57) ABSTRACT

A cosmetic contact lens includes a first polymerized diffractive film of predetermined shape that is polymerized within a second polymer that supports the first polymerized diffractive film at a desired position and forms the contact lens.

15 Claims, 4 Drawing Sheets

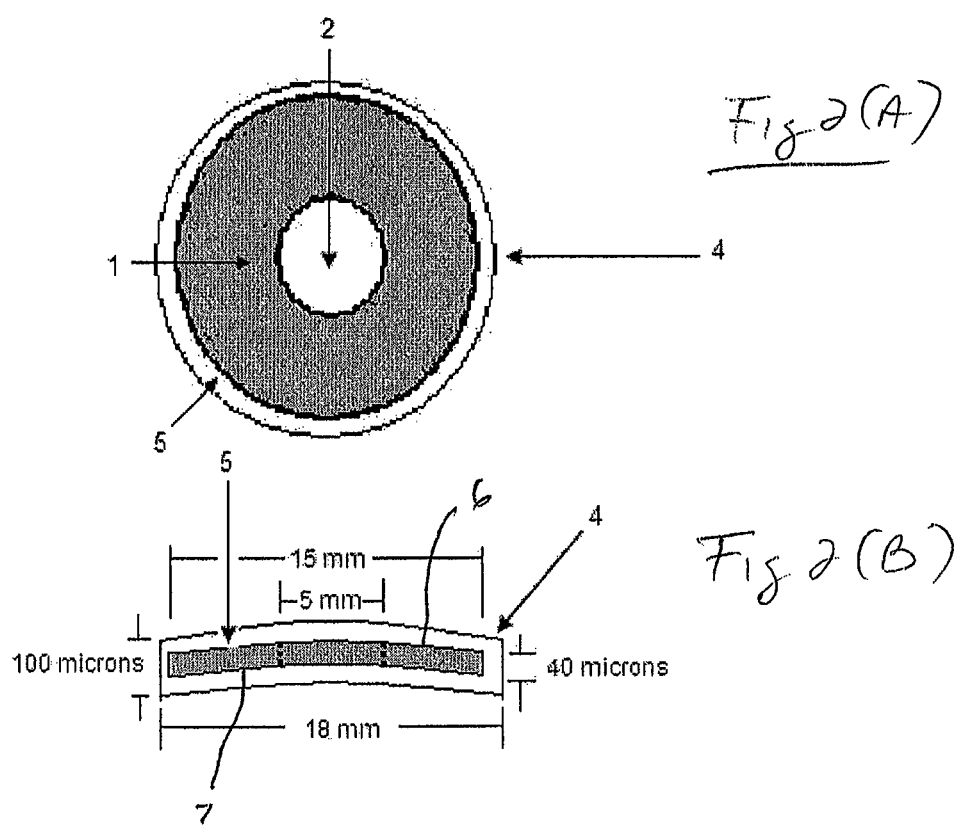

COSMETIC CONTACT LENS WITH VIVID SPARKLING COLOR OVER THE IRIS

CROSS-REFERENCE TO RELATED APPLICATION

This application claims the benefit of U.S. provisional application No. 61/756,128, filed Jan. 24, 2013, entitled "COSMETIC CONTACT LENS WITH VIVID SPARKLING COLOR OVER THE IRIS", the contents of which are incorporated herein by reference.

BACKGROUND OF THE INVENTION

1. Field of the Invention

The present invention relates to contact lenses and, more particularly, to contact lenses that changes or enhances a color of a first area of the eye, e.g., the iris, without altering a second area of the eye, e.g., the pupil.

2. Description of the Prior Art

Eyes are perceived to be particularly attractive when the color of the iris is vibrant or sparkling. Hydrogels modified to diffract light have significant potential to create sparkle and vibrancy. U.S. Pat. No. 7,059,719 (hereinafter "the '719 patent"), which is incorporated herein by reference, discloses a colored contact lens that incorporates a crystalline colloidal ordered array of particles to diffract light to impart vivid sparkling color to the whole lens or a portion of the lens. When worn, an embodiment of the cosmetic lens disclosed in the '719 patent generally restricts color modification to the iris of the eye, excluding generally the area of the pupil of the eye. However, diffracting hydrogels including polymerized crystalline colloidal (PCCA) arrays have not been used for this purpose as the art does not disclose a method or means to make a contact lens that restricts the diffracting hydrogel to areas of desired color modification.

It is believed that restricting such diffracting hydrogels to only certain areas of the contact lens corresponding to eye structure may be difficult to achieve due to the usual method employed to manufacture the contact lens which usually involves a molding process.

U.S. Pat. No. 5,281,370 (hereinafter "the '370 patent") and U.S. Pat. No. 5,989,923 (hereinafter "the '923 patent") disclose hydrogels that are capable of Bragg diffraction that produces vivid colors in the visible spectrum. The '370 patent and the '923 patent are both incorporated herein by reference. The '370 patent discloses a self-order array of particles whose spacing is on the order of the wavelength of visible light. The '923 patent discloses a holographic pattern capable of diffracting visible light.

The '719 patent (discussed above) discloses colored contact lenses that obtain their color through Bragg diffraction. The '719 patent further discloses that all or part of the lens may be colored. Diffraction is produced by inclusion of hydrogels that diffract visible light. The '719 patent, however, does not disclose a means or method to localize the diffractive material in the lens so that the color effect is isolated to a specific area of the eye.

Generally cosmetic lenses are produced by placing a monomer, cross linker and initiator mixture in a mold and exposing the thus contained mixture to an energy source such as visible light, UV light or heat depending on the initiator. To tint such a lens, a tint can be added to the mixture prior to polymerization (see e.g., U.S. Pat. No. 6,123,845). The tint diffuses throughout the mixture such that the entire resultant lens is tinted. The tint then appears over both the iris and the pupil of the eye. The tint typically does not produce vibrant color modification so that the effect to pupil is generally unnoticed. However, if the entire lens were a diffractive hydrogel material that produces vivid colors, the pupil would be strongly colored, giving the eye a strange or unnatural appearance.

If the mixture used to synthesize the diffractive hydrogel were just placed into the lens monomer mixture, they would both mix and the diffractive properties might be changed or lost altogether. If the diffractive properties remained, both the iris and pupil would experience an undesirable color change.

To illustrate, consider the synthesis of a polymerized crystalline colloidal array (PCCA) hydrogel. Synthesis of the PCCA hydrogel requires mixing a monomer, a cross-linker, an initiator to facilitate polymerization, and like-charged nanometer sized spherical particles in a water-based solution. The mixture cannot contain radicals which are removed, e.g., without limitation, with an ion exchange resin, so that the charged spherical particles can self-organize into an ordered array. The mixture is then polymerized using heat, visible light, or ultraviolet (UV) light, depending upon the material used to synthesize the colloidal particles and, subsequently, the initiator. Thus, the PCCA monomer mixture cannot just be added to the lens monomer as it would disperse throughout the lens monomer.

What is, therefore, needed is a structure, means and method to manufacture a contact lens that uses a diffracting hydrogel to (1) modify only the color of a desired area of the eye, e.g., the iris of the eye, when the lens is worn or (2) modify the wavelength of light received/reflected in a desired area of the eye, e.g., the pupil of the eye.

SUMMARY OF THE INVENTION

Disclosed herein is a means and method to make cosmetic or colored contact lenses that obtain their color by Bragg diffraction. Specifically, the colored contact lens obtains it color through the diffraction properties of a hydrogel that contains or includes a diffraction grating. The diffraction grating is either an ordered array of like-charged colloidal particles that self-organize into an ordered array capable of diffracting light or a holographic grid produced by a photographic process that is also capable of diffracting light. More specifically, the hydrogel containing the diffraction grating is localized within the contact lens so that color is produced only in cosmetically desired areas of the lens, e.g., the iris, which is the colored portion of the eye. Also disclosed herein is a means and method to ensure that only the iris is covered by the diffracting hydrogel to provide the most attractive affects without significantly altering manufacture of the lens.

More specifically, disclosed is a contact lens (desirably a cosmetic contact lens) that comprises a first polymerized diffractive film of predetermined shape that is polymerized within a second polymer that supports the first polymerized diffractive film and forms the contact lens.

The polymerized second polymer can completely or partially surround the first polymerized diffractive film. The polymerized second polymer can be clear.

The first polymerized diffractive film can be annulus-shaped and can be positioned in the polymerized second polymer such that when the contact lens is worn on an eye, the first polymerized diffractive film covers an iris of the eye.

The first polymerized diffractive film and the polymerized second polymer can each have substantially the same water content, e.g., without limitation, in the range of 40% to 50%.

The first polymerized diffractive film can be polymerized separately from the polymerized second polymer. The first polymerized diffractive film and the polymerized second polymer can each be synthesized from a HEMA monomer.

The first polymerized diffractive film can diffract light in the visible spectrum.

The first polymerized diffractive film can be between 10-60 microns thick. The contact lens can have a total thickness between 90-120 microns.

The first polymerized diffractive film can be a holographic film that desirably filters out UV light.

The first polymerized diffractive film can be circular-shaped and can be positioned in the polymerized second polymer such that when the contact lens is worn on an eye, the first polymerized diffractive film covers a pupil of the eye.

The first polymerized diffractive film can be a PCCA film. The PCCA film can include an ordered array of charged polystyrene spheres. The spheres are desirably of a uniform diameter in the range between 90-200 nanometers, depending on the wavelength of diffraction desired.

Also disclosed is a method of making a contact lens comprising: (a) positioning a polymerized diffractive film in a contact lens mold; (b) either before or after step (a), including a monomer mixture in the mold; and (c) polymerizing the monomer mixture of step (c), whereupon the polymerized monomer mixture supports the polymerized diffractive film.

The method can include, before step (c), sealing the mold.

The monomer mixture is desirably polymerized with either visible light or UV light based on an initiator included in the monomer mixture.

BRIEF DESCRIPTION OF THE DRAWINGS

FIGS. 2(A) and 2(B) are respective plan and side views of one embodiment finished contact lens that includes the polymerized annular diffractive hydrogel film of FIGS. 1(A) and 1(B) supported by a lens polymer that is polymerized following the addition of pre-polymerized lens polymer to a mold that includes the polymerized annular diffractive hydrogel film;

DETAILED DESCRIPTION OF THE PREFERRED EMBODIMENTS

Figures 1A, 1B:
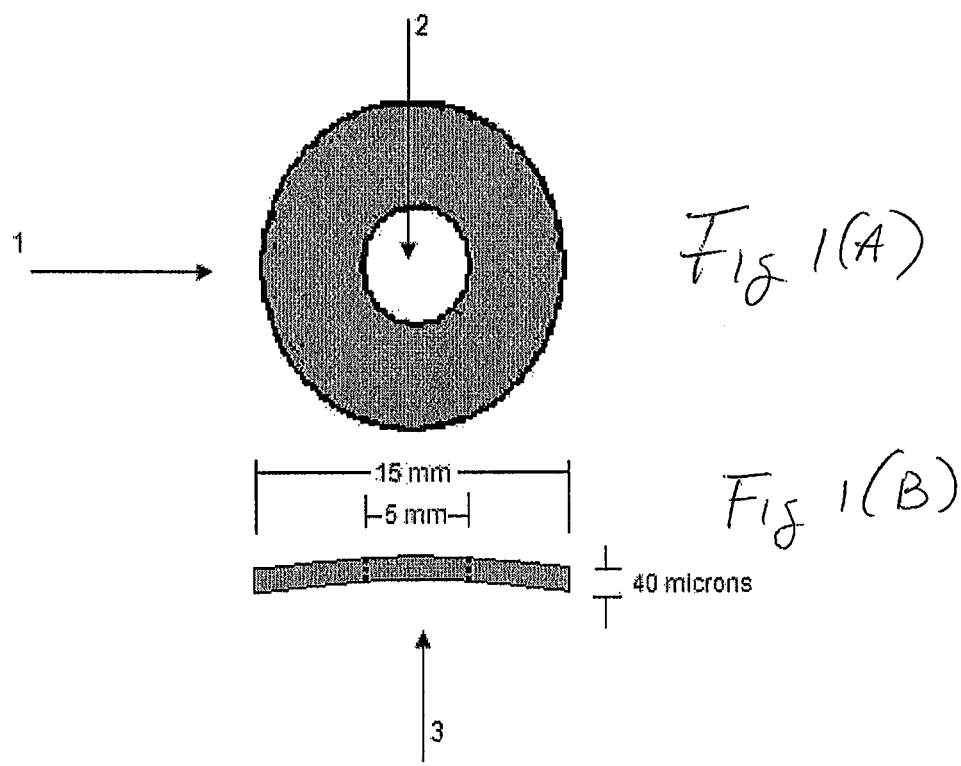
FIGS. 1(A) and 1(B) are respective plan and side views of a polymerized annular diffractive hydrogel film that can be included in a finished contact lens for colorizing a desired part of the eye, e.g., the iris of the eye.

Typically, contact lenses are made of hydroxyethyl methacrylate (HEMA) monomer or a HEMA/siloxane mix in solution with cross-linker and initiator in water, individually molded, and polymerized. The resultant lens is approximately 1 cm in diameter and approximately 90-120 μm thick. Polymerization of the liquid monomer mixture is completed with application of heat, visible light or UV light, depending upon the initiator used. Water content in HEMA is approximately 40% to 46%. The dimensions and percentages described herein are exemplary only and are not to be construed as limiting in any way.

Cosmetic or color contact lenses are intended to change or enhance the color of a desired area of the eye, e.g., without limitation, the iris. Every new color typically requires a new dye which in the U.S. must undergo a safety review by the U.S. Food and Drug Administration (FDA). The capability to manufacture and market a new color lens without use of a new dye would, therefore, be a significant advance, possibly eliminating the need for FDA review.

A diffracting hydrogel can be synthesized to provide a specific color in the visible spectrum. For instance, in a PCCA hydrogel, once the particle material and particle size are fixed in an array, Bragg diffraction is determined solely by the spacing of the particles in the array. Using the same formulation, different only in the number of particles per unit volume, produces a different color and probably would not require FDA review. Bragg diffraction by PCCA is efficient and thus can be accomplished with very thin PCCA hydrogel material. Additionally, PCCA hydrogels produce more radiant colors than those produced by dyes.

A process of producing a green HEMA PCCA annular diffractive hydrogel film includes the following steps:

Step 100: Provide polystyrene particles 170 nanometers in diameter. The use of different, uniform diameter polystyrene particles, however, is envisioned. These particles can be produced using any well know process, e.g., without limitation, emulsion polymerization.

Step 102: Provide a mixture of 1.44 grams 2-hydroxylethyl methacrylate (HEMA) and 0.015 grams poly(ethylene glycol) 200 dimethacrylate (PEG 200 DMA).

Step 104: Add a spatula of aluminum oxide to the mixture of step 102, shake manually and centrifuge for 2 minutes.

Step 106: Filter the mixture of step 104 through 0.22 mkm filter.

Step 108: Weigh out 0.6 grams of the filtered mixture of step 106 in a separate vial.

Step 110: Add to the vial of step 108, 2 grams of the polystyrene particles of step 100 mixed with 30% diethylene glycol.

Step 112: Add to the mixture of step 110, 0.05 grams of initiator, 10% 2,2-diethoxyacetophenone (DEAP) in dimethyl sulfoxide (DMSO).

Step 114: Add to the mixture of step 112 an ion-exchange resin and spin for 10 minutes.

Step 116: Inject the mixture spun in step 114 between two glass or quartz plates separated by a desirably thick spacer, e.g., without limitation, a 30 microns thick spacer.

Step 118: Expose the plates and mixture of step 116 to UV light for 20 minutes, whereupon synthesis or production of the diffractive hydrogel film is complete. The plates are then opened and the synthesized diffractive hydrogel film is stored in water. Diffraction produced by this diffractive hydrogel film is bright green. Desirably, this embodiment diffractive hydrogel film has an annular shape. However, this is not to be construed as limiting in any way.

To localize the diffractive hydrogel film in a finished contact lens, the diffractive hydrogel film of desired shape is first synthesized, e.g., without limitation, in accordance with steps 100-118 above, that is much thinner than the thickness of the finished contact lens itself. This diffractive hydrogel film (also referred to herein as a first polymerized diffractive film) is then positioned in a contact lens mold. Next, a contact lens monomer mixture with initiator are added to the mold that includes the diffractive hydrogel film and polymerized to form a contact lens hydrogel that includes the diffractive hydrogel film suspended therein. An interpenetrating network is then formed locking the diffractive hydrogel film within the contact lens hydrogel (also referred to herein as a polymerized second polymer).

Desirably, the finished contact lens is approximately 90-120 microns thick and the diffractive hydrogel film has a constant thickness between 10-60 microns thick. The water content of the diffractive hydrogel film is desirably substantially the same as the water content of the contact lens hydrogel, e.g., between 40% and 50%.

FIGS. 1(A)-1(B) show plan and side view of a diffractive hydrogel film 1, in the form of an annulus, for colorizing an area within a conventional contact lens (not shown in FIGS. 1(A)-1(B)) that rests over a desired part of the eye, in this example, the iris. Desirably, as shown in FIG. 1(B), the diffractive hydrogel film 1 has a radius of curvature that approximates the contour of the eye surface, and is a better fit with a mold used to produce the finished contact lens.

In FIGS. 1(A)-1(B), the diffractive hydrogel film 1 is formed via polymerization prior to forming the finished contact lens. The annular diffractive hydrogel film 1 is desirably made from the same type or batch of hydrogel that is used to make the finished contact lens. As such, diffractive hydrogel film 1 desirably has the same, or substantially the same, water content as the contact lens hydrogel. Diffractive hydrogel film 1 is formed (or processed after formation) to have an annular shape that is sized to substantially or completely cover a desired area of the eye, in this example, the iris of the eye. A hole 2 in diffractive hydrogel film 1 is sized so that the pupil of the eye is not covered or is only partially covered by diffractive hydrogel film 1 whereupon the pupil does not take on the color imparted by diffractive hydrogel film 1. Diffractive hydrogel film 1 may be either molded flat or molded with a slight radius of curvature 3 to approximate that of the eye in the area of the pupil/iris structure.

With reference to FIGS. 2(A)-2(B), after formation, diffractive hydrogel film 1 is positioned in a lower part of a mold used to form a finished contact lens 4. The lower part of the mold is then filled with the monomer mixture containing a cross-linker and initiator used to form the finished contact lens 4, which is normally polymerized in the manner discussed hereinafter to form a lens polymer 5. An upper part of the mold is then placed over the lower part of the mold and the monomer mixture containing cross-linker and initiator is polymerized by exposing it and the mold to an energy source, desirably visible light or UV light as the colloidal particles of the diffractive hydrogel film 1 are typically polystyrene spheres susceptible to heat damage. When polymerization of the lens polymer 5 is complete, the finished contact lens 4 forms an interpenetrating network with the diffractive hydrogel film 1. Desirably diffractive hydrogel film 1 is surrounded by lens polymer 5 as shown in FIG. 2(B). However, this is not to be construed as limiting since it is envisioned that lens polymer 5 can support diffractive hydrogel film 1 with a substantial portion or all of top surface 6 or bottom surface 7 of diffractive hydrogel film 1 not covered or surrounded by lens polymer 5.

Diffraction by diffractive hydrogel film 1 is very efficient and essentially happens within the first several microns of diffractive hydrogel film 1. Thus, diffractive hydrogel film 1 can be quite thin. For a particular color, diffractive hydrogel film 1 might be 30 μm thick. The thickness of diffractive hydrogel film 1, however, can be as small as 10 μm particularly if two or more diffractive hydrogel films having the same or different diffraction properties are to be layered, as discussed hereinafter. Similar performance can be expected from a holographic hydrogel film.

To further increase the vibrancy of diffractive hydrogel film 1, it is possible to add a black matrix on either the back surface of diffractive hydrogel film 1 or integrate a carbon matrix among the colloidal particles of diffractive hydrogel film 1.

Figure 3A:
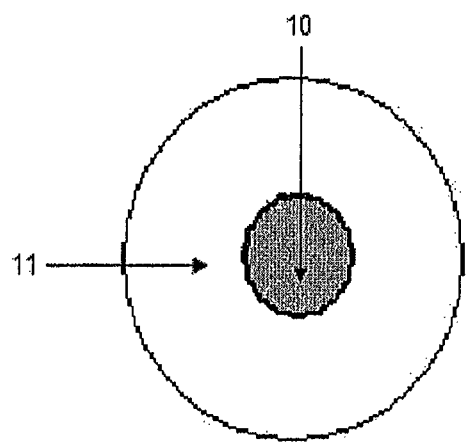
FIGS. 3(A) and 3(B) are respective plan and side views of another embodiment finished contact lens that includes a polymerized circular diffractive hydrogel film disposed at a location within a polymerized lens polymer for altering the wavelength(s) of light that reach a desired part of the eye, e.g., the pupil of the eye, wherein the polymerized circular diffractive hydrogel film is supported by a lens polymer that is polymerized following the addition of pre-polymerized lens polymer to a mold that includes the polymerized circular diffractive hydrogel film.
Figure 3B:
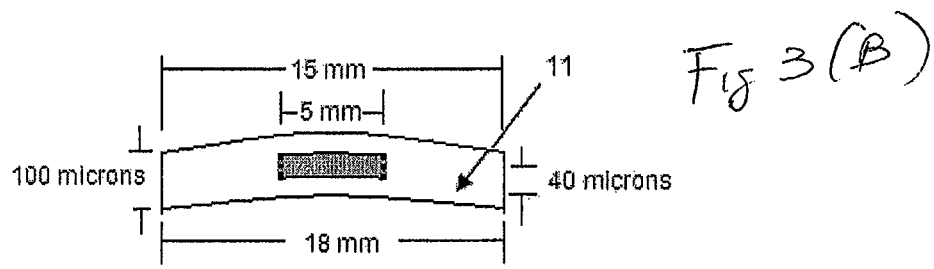

While annular diffractive film 1 can be used to color the iris of the eye as shown in FIGS. 2(A)-2(B), a polymerized circular diffractive film 10, shown in FIGS. 3(A)-3(B), that is positioned over the pupil can be used to alter the wavelength of light the reaches an eye of a wearer of a finished contact lens. In this embodiment, diffractive film 10, which is made from the same materials and process as diffractive film 1, is first polymerized and then placed in the lens mold in the area where diffractive film 10 in the finished contact lens 11 would cover the pupil. Next, the monomer mixture containing cross-linker and initiator that is used to form the actual/finished contact lens is then added to the mold. The mold is then closed and the monomer mixture containing cross-linker and initiator is exposed to an energy source to initiate polymerization. After polymerization, the finished contact lens 11 forms an interpenetrating network with the diffractive film 10 as shown in FIG. 3(A)-3(B).

Figure 4A:
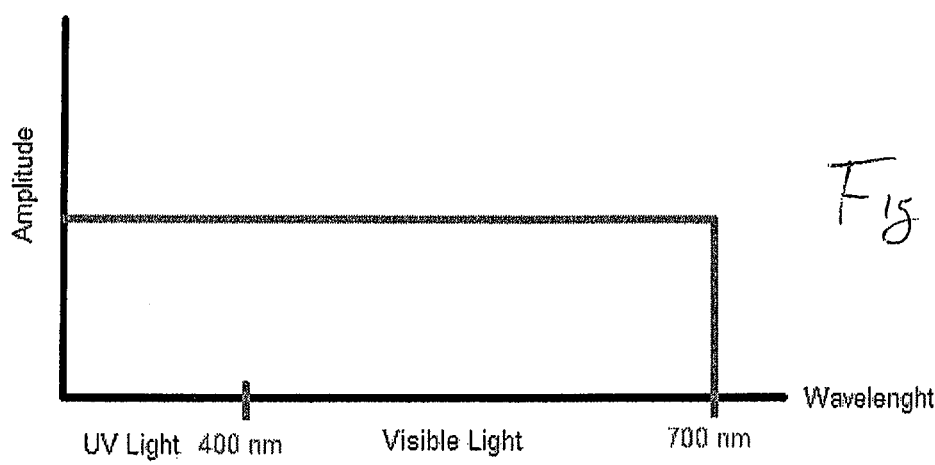
FIGS. 4(A)-4(C) are graphs illustrating how the polymerized circular diffractive hydrogel film of the finished contact lens of FIGS. 3(A) and 3(B) can filter out UV light from entering the eye.
Figure 4B:
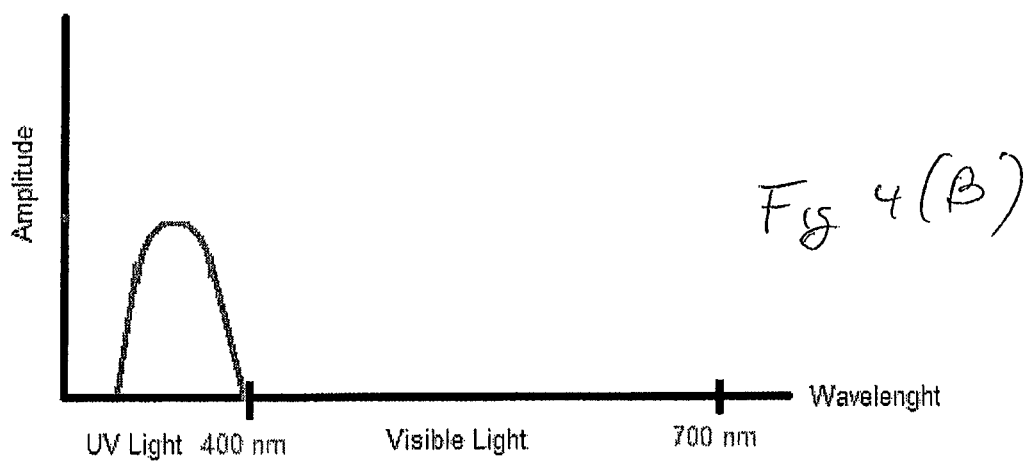
Figure 4C:
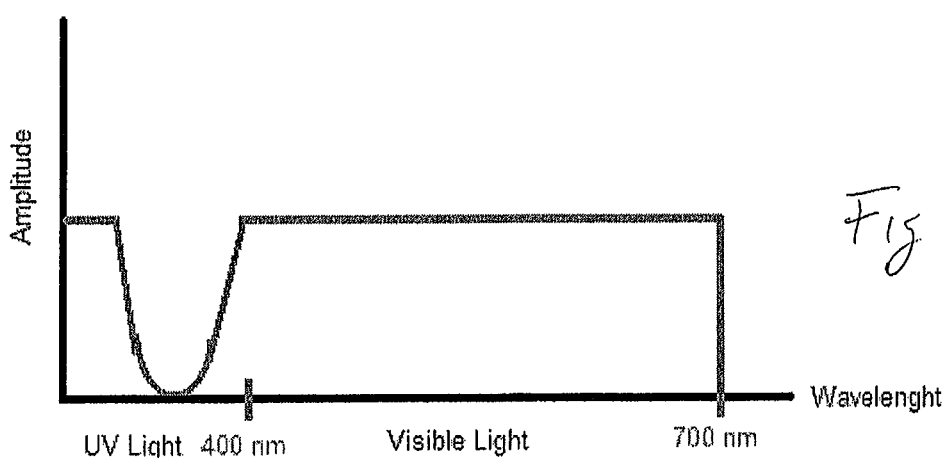

By appropriate selection of the spacing of particles in the array thereof, circular PCCA hydrogel film 10 shown in FIGS. 3(A)-3(B) can be used to filter out ultraviolet (UV) light so that it does not enter the eye. FIGS. 4(A)-4(C) show this filtering process.

FIG. 4(A) is a graph of the UV-visible light spectrum. The UV spectrum begins at the violet end of the visible spectrum and is composed of wavelengths less than 400 nm. UV filtering is achievable with diffractive PCCA hydrogel film 10 by reducing the ordered spacing of the colloidal particles (e.g., polystyrene particles) comprising diffractive film 10 to the wavelength of light near the UV part of the spectrum. The Bragg diffracted reflected UV spectrum of diffractive film 10 with this ordered spacing of colloidal particles is shown in FIG. 4(B). The spectrum transmitted to the eye is shown in FIG. 4(C) and includes the spectrum shown in FIG. 4(A) minus the spectrum shown in FIG. 4(B). The wearer of the finished contact lens 11 shown in FIG. 3(A)-3(B) sees an image composed of the visible spectrum minus the UV spectrum. The diffractive film 10 can be made such that it is nearly invisible to an observer. UV light entering the eye is often linked to the formation of cataracts.

The annular diffractive hydrogel film 1 shown in FIGS. 1(A)-1(B), can be used in combination with the circular diffractive film 10 shown in FIGS. 3(A)-3(B) to color the iris of the eye and also modify or alter the vision of the wearer.

In another embodiment, multiple diffractive hydrogel films 1 and/or diffractive film 10 with different diffractive properties can be layered, one atop of each other, to produce a diffraction reflected spectrum so that the wearer sees an image consisting of light wavelengths not reflected, but which pass through the layered films. In this embodiment, the pupil takes on a color produced by the reflected spectrum. More significantly, though, the light reaching the wearer's eye can be tailored such that the surroundings seen by the wearer have items that may be emphasized (enhanced) or de-emphasized to improve observation of specific objects. For instance, the wearer's vision can be enhanced to pick up a tennis ball in flight.

The invention has been described with reference to different embodiments. Obvious modifications and alterations of these embodiments will occur to those skilled in the art upon reading and understanding the preceding detailed description. It is intended that the invention be construed as including all such modifications and alterations insofar as they fall within the scope of the appended claims or the equivalents thereof.

The invention claimed is:

1. A contact lens comprising a first polymerized diffractive film of predetermined shape that is polymerized within a second polymer that supports the first polymerized diffractive film and forms the contact lens, wherein:
   the first polymerized diffractive film is polymerized in response to exposure to light;
   the second polymer is polymerized in response to exposure to light;
   the first polymerized diffractive film and the polymerized second polymer each have substantially the same water content;
   the first polymerized diffractive film is a PCCA film that includes an ordered array of charged polystyrene spheres; and
   the second polymer does not include a PCCA.

2. The contact lens of claim 1, wherein the polymerized second polymer surrounds the first polymerized diffractive film.

3. The contact lens of claim 1, wherein the polymerized second polymer is clear.

4. The contact lens of claim 1, wherein the first polymerized diffractive film is annulus-shaped and is positioned in the polymerized second polymer such that when the contact lens is worn on an eye, the first polymerized diffractive film covers an iris of the eye.

5. The contact lens of claim 1, wherein the water content is in the range of 40% to 50%.

6. The contact lens of claim 1, wherein the first polymerized diffractive film is polymerized separately from the polymerized second polymer.

7. The contact lens of claim 1, wherein the first polymerized diffractive film and the polymerized second polymer are each synthesized from a HEMA monomer.

8. The contact lens of claim 1, wherein the first polymerized diffractive film diffracts light in the visible spectrum.

9. The contact lens of claim 1, wherein the first polymerized diffractive film is between 10-60 microns thick.

10. The contact lens of claim 1, having a total thickness between 90-120 microns.

11. The contact lens of claim 1, wherein the first polymerized diffractive film is a holographic film.

12. The contact lens of claim 11, wherein the first polymerized diffractive film is circular-shaped and is positioned in the polymerized second polymer such that when the contact lens is worn on an eye, the first polymerized diffractive film covers a pupil of the eye.

13. A method of making a contact lens comprising:
   (a) positioning in a mold a PCCA diffractive film that was polymerized in response to exposure to light and which includes an ordered array of charged polystyrene spheres;
   (b) either before or after step (a), including a monomer mixture in the mold; and
   (c) polymerizing the monomer mixture of step (b) via exposure to light, wherein the diffractive film and the polymerized monomer mixture each have substantially the same water content, and the polymerized monomer mixture does not include a PCCA.

14. The method of claim 13, further including, before step (c), sealing the mold.

15. The method of claim 13, wherein:
   the light of step (a) is either visible light or UV light based on an initiator included in a monomer mixture used to form the diffractive film of step (a); and
   the light of step (c) is either visible light or UV light based on an initiator included in the monomer mixture of step (c).

* * * * *